Dec. 26, 1967 M. P. FABISCH 3,360,780

DATA PROCESSOR UTILIZING COMBINED ORDER INSTRUCTIONS

Filed Oct. 7, 1964 3 Sheets-Sheet 1

INVENTOR
M. P. FABISCH
BY John C Albrecht
ATTORNEY

DATA PROCESSOR UTILIZING COMBINED ORDER INSTRUCTIONS

Filed Oct. 7, 1964 5 Sheets-Sheet 2

FIG. 3

| 27 | 26 | 25 | 24 | 23 | ORDER |
|---|---|---|---|---|---|
| 1 | 0 | | | | READ , RD , 25-0 |
| 0 | 0 | | | | REGISTER-TO-REGISTER , RTR , 25-0 |
| 0 | 1 | 0 | | | WRITE , WRT , 24-0 |
| 0 | 1 | 1 | 0 | 0 | SHIFT , SFT , 22-14 |
| 0 | 1 | 1 | 1 | 0 | TRANSFER , XFR , 22-0 |
| 0 | 1 | 1 | 1 | 1 | SHIFT-WRITE , SFT-WRT , 22-0 |
| 0 | 1 | 1 | 0 | 1 | SHIFT-TRANSFER, SFT-XFR, 22-0 |
| 1 | 1 | | | | SHIFT-READ, SFT-RD, 25-0 |
| | | | | | |
| 1 | 1 | | | | READ INTO TWO REGISTERS, SFT-RD, 25-0 (WITH BITS 18-14 REPRESENTING THE BINARY NUMBER 10110) |

3,360,780

DATA PROCESSOR UTILIZING COMBINED ORDER INSTRUCTIONS

Michael P. Fabisch, Shrewsbury, N.J., assignor to Bell Telephone Laboratories, Incorporated, New York, N.Y., a corporation of New York Filed Oct. 7, 1964, Ser. No. 402,273
19 Claims. (Cl. 340—172.5)

ABSTRACT OF THE DISCLOSURE

I disclose a stored program data processor of the type which uses combined order instructions to perform two operations in a single machine cycle. For example, one of these operations may be a shift operation and the other may be a read operation. A detector is provided which is responsive to the magnitude of the shift being greater than the number of bits in the shift register. When the detector operates, the shift operation is inhibited and the read operation is caused to store the word read in two of the machine registers rather than in one. Accordingly, it is no longer necessary to employ two separate read instructions in order to place a word into two registers.

Figure 1:
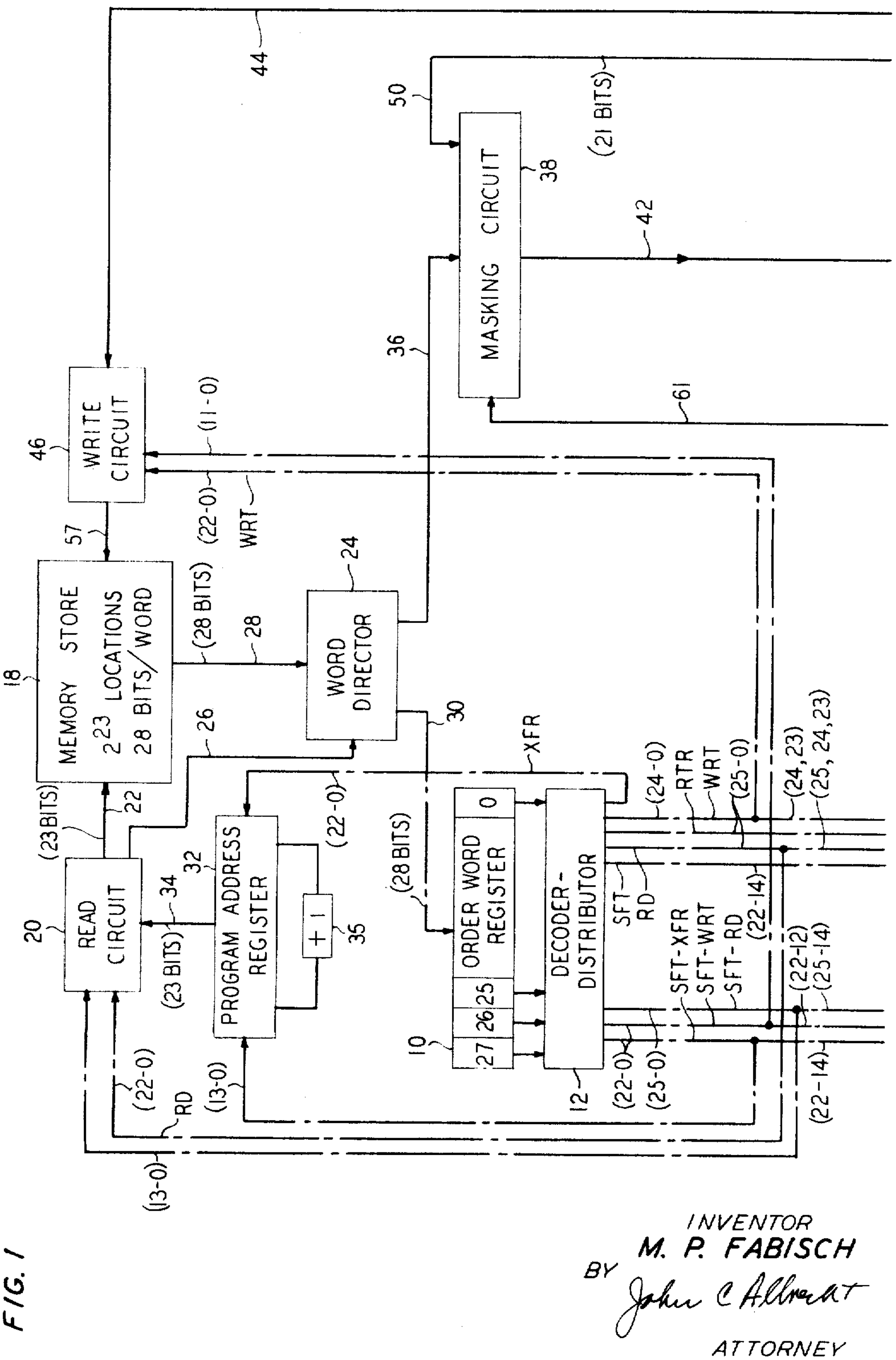

This invention relates to data processing equipment and more particularly to arrangements for increasing the data processing capacity of the equipment in a given interval of time, such as the time for executing an order specified by a single instruction word.

A data processing system generally includes a memory system for storing instruction words and data, and a processor for obtaining information from the memory system, for writing information into the memory system, and for processing data in accordance with the instructions obtained from the memory system.

Each instruction word may cause the processor to perform a specified data processing operation, while a particular data processing function may require several single operations and thus several instruction words or machine cycles. To increase the data processing capacity of the machine and thus to decrease the time required to perform its functions, there is disclosed in the copending application of W. Ulrich, Ser. No. 402,090 filed Oct. 7, 1964, arrangements whereby a single instruction may be utilized to cause the machine to perform two operations in a single machine cycle. Such an instruction, referred to as a combined instruction, is disclosed in the Ulrich application in an arrangement for both obtaining a data word from memory and simultaneously shifting a different data word priorly stored in a register. Normally in a logical data processor, a first instruction is required whenever a data word is to be read from a memory location, and a second instruction, and hence a second machine cycle, is required to specify that a data word in a register be adjusted by shifting or rotating the data elements thereof to the right or to the left. However, with the single combined instruction, as disclosed in the Ulrich application, and without increasing the time required to execute a single instruction, a word may be read from memory and simultaneously a different word in one of the machine registers may be adjusted to the left or to the right by shifting or rotating the word an amount specified by the single combined instruction. Other combined-order instructions are described in the above-identified W. Ulrich application.

Such single instructions which serve to manipulate data within the data processor while simultaneously transferring data within the data processor are very advantageous because the data processing capacity of a machine may be increased since the work functions which previously required the execution of two successive instructions are completed by the execution of a single combined instruction.

The combined-order instructions in the system just described are directed to sequences in which it is necessary to both transfer a data word within the machine and to shift or rotate a word in one of the machine registers. Another sequence of importance is one which controls the reading of a word from memory into two of the machine registers. It is often necessary to operate on a data word to derive a different word. At the same time it may be necessary to maintain the original data word in one of the registers. For example, it may be necessary to compare the modified word with the original word. In conventional prior art data processors an instruction is provided which controls the reading of a data word into one of the machine registers. If it is necessary to store the data word in two registers two of these instructions must be executed.

It is a general object of my invention to improve the data handling capacity of data processors and specifically to increase their speed of operation.

It is another object of my invention to increase the number of data operations which may be performed in response to a single instruction word.

It is a more specific object of this invention to read a data word and store it in two registers of a data processor under the control of a single instruction word.

It is a more specific object of this invention to utilize the combined read-shift instruction in the above-identified W. Ulrich application for this purpose, a particular read-shift instruction controlling the storage of the word read in two of the machine registers rather than the storage of the word in only one register and the shifting of a register word.

The principles of my invention may be best understood by first considering the combined-order instruction on which it is based. In the above-identified W. Ulrich application a data processor is shown in which instruction words are 28 bits in length. Data words, each 21 bits in length, are stored in a memory which contains $2^{23}$ addresses, a 23-bit address thus being required to identify a memory word. When a read order is executed, one of the data words in the memory store is read out of the memory into one of the 21-bit registers included in the system. Five bits are required to specify the read order itself (including the identity of one of the registers). The remaining 23 bits in the instruction word identify any one of the $2^{23}$ addresses in the memory store from which the word is to be read.

In this system a shift order requires only 14 bits of an instruction word of which five bits again specify the shift order itself, and nine bits are required to identify a particular register, the type of shift operation to be performed, the magnitude of the shift, and its direction. Thus, on a shift order, 14 of the 28 available bits in the instruction word are not used. Without the combined read-shift order however read and shift orders could not both be specified by the same instruction word. To designate both orders 28+14, or 42, bits would be required and an instruction word contains only 28 bits.

However the combined read-shift order allows the two orders to be specified by the same instruction word. A new five-bit code denominates both shift and read orders. Nine bits are still required to convey the shift information. Thus, only 14 bits in the instruction word remain. The only other information which must be carried in the instruction word is the address in the memory whose contents are to be read during the execution of the combined order. These 14 bits may specify any one of $2^{14}$ addresses in the memory store, rather than any address in the full range of $2^{23}$. Thus, while the range of addresses in the combined shift-read order is restricted the combined order may be used whenever the word to be read is contained in one of the first $2^{14}$ addresses of the memory.

In the system just described it is not possible to read a word from memory directly into two of the registers. A read order specifies only one register and the word read is stored in this single register. In acocrdance with the principles of my invention the combined shift-read order is utilized to control the reading of a word from memory into two of the registers. It will be recalled that included in the 28 bits of a combined shift-read instruction word are nine bits which convey the shift information. Included in these nine bits are five bits which specify the magnitude of the shift. Five bits are required to specify a shift magnitude of 1–21 positions. It is never required that a shift magnitude of more than 21 positions be specified since the registers have only 21 bits. In my invention a special detector is provided to detect a shift magnitude of 22 positions in a shift-read order. The detector operates to inhibit the shift operation. The read operation is performed in the ordinary manner, the word read being stored in the register specified in the instruction word. The detector additionally control the storage of the word read into a second one of the registers. Thus when a shift-read order specifies a shift magnitude of 22 positions the ordinary read order is executed, and instead of the shift order being executed the word read is stored in a second one of the machine registers. A primary advantage of such a system is that a minimum amount of modification is required in the shift-read circuitry in order to provide an instruction which controls the reading of a memory word into two of the machine registers.

In the illustrative embodiment of the invention the representation of the shift magnitude 22 in a shift-read order controls the storage of the word read in a predetermined one of the system registers (in addition to its storage in the register specified in the read part of the instruction word). It is apparent however that it is possible to control the storage of the word read into various ones of the registers depending on the shift magnitude specified, rather than storing the word in only a predetermined one of the registers. For example, a shift magnitude of 22 might control the storage of the word in a first register (in addition to its storage in the register specified in the read part of the instruction word), a shift magnitude of 23 might control the storage of the word in a second one of the system registers, a shift magnitude of 24 might control the storage of the word in a third one of the registers, etc. Furthermore, in the illustrative embodiment of the invention a shift magnitude greater than 21 controls a modified operation only when a shift-read order is executed. However, it is apparent that similar circuits may be provided to control additional operations when a shift magnitude greater than 21 is specified on combined orders other than shift-read. For example, on the shift-write order described in the above-identified W. Ulrich application a shift magnitude of 22 might control a first additional operation, a shift magnitude of 23 might control a second additional operation, etc. The essence of the invention is in the provision of means for detecting a shift magnitude greater than the number of stages in one of the system registers in a combined-order instruction word, and utilizing this magnitude to control an additional operation which could otherwise not be effected.

It is a primary feature of this invention to detect a shift magnitude in a combined-order which is greater than the maximum shift magnitude which would ever be required, and to control the operation of the data processor to effect an additional operation in accordance with the shift magnitude detected.

It is a feature of this invention, in the illustrative embodiment thereof, to detect a predetermined shift magnitude in a shift-read instruction word for controlling the storage of the word read from the memory into a predetermined register in addition to its storage in the register specified in the instruction word.

Figure 2:
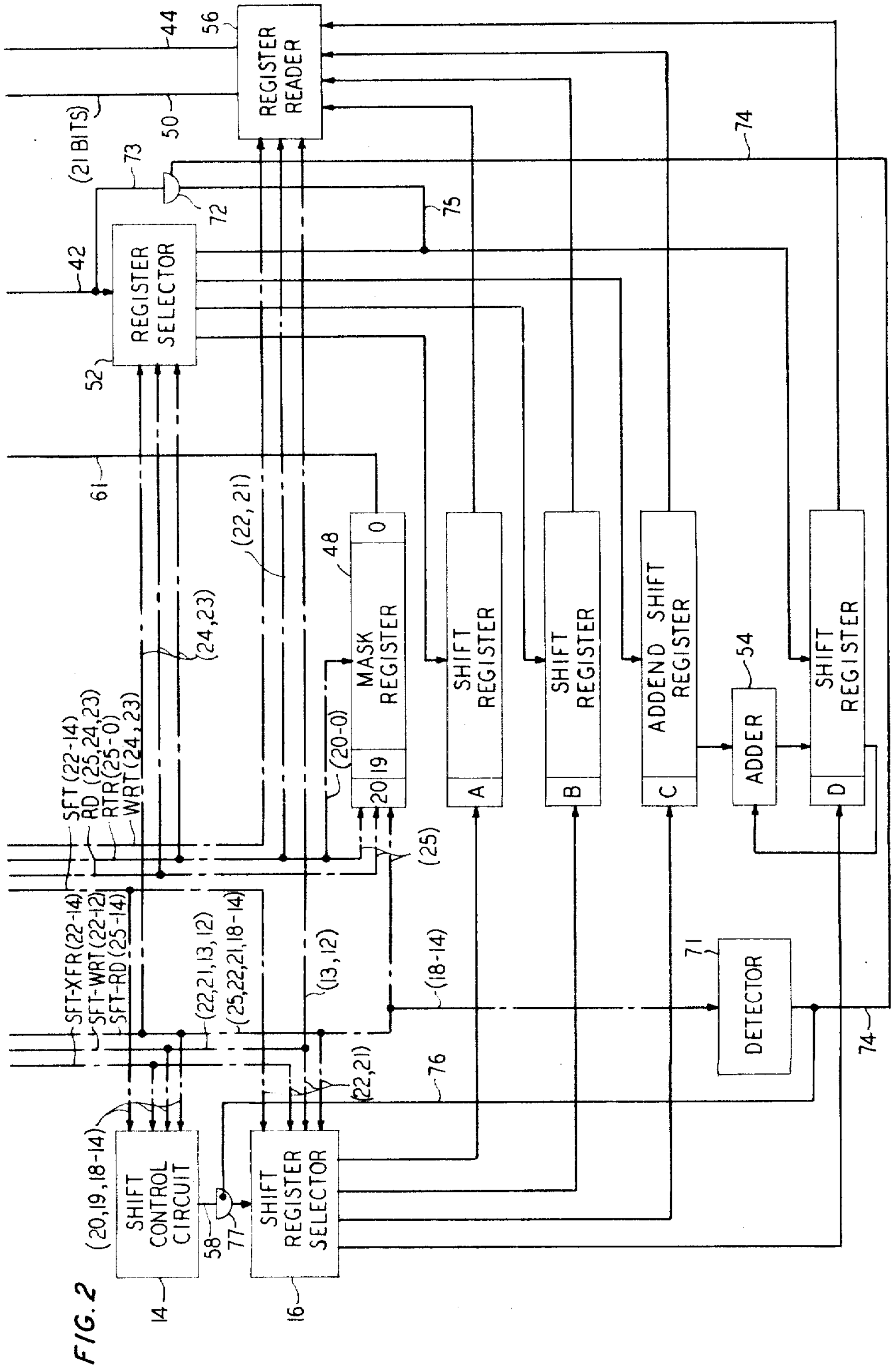

Further objects, features and advantages of the invention will become apparent upon consideration of the following detailed description in conjunction with the drawing, in which:

FIGS. 1 and 2 (with FIG. 1 being placed on top of FIG. 2) are a schematic representation of a data processor illustrative of one embodiment of my invention; and FIG. 3 is a table indicating the coding of various orders of the data processor of my invention.

In FIGS. 1 and 2 there is shown one illustrative embodiment of my invention incorporated in a data processor depicted in simplified form. Thus, various elements of data processors well known in the art but not necessary for an understanding of my invention, such as timing circuitry, have been omitted. Further, as various of the functional blocks depicted perform known and recognized operations, the details of such circuitry have not been shown. A specific data processor in which my invention may advantageously be employed is disclosed in Doblmaier et al. application Ser. No. 334,875, filed Dec. 31, 1963, and such disclosure is hereby incorporated herein.

In the drawing and subsequent description the bits of the various words are specified with the more significant or higher order bit first. Thus, bits 22–14 specifies the bits 22 through 14 in descending order of significance.

Turning now to FIGS. 1 and 2, there will first be explained the operation of the data processor utilizing the individual and combined orders, and then the operation of the circuitry to utilize the combined shift-read order in accordance with my invention.

In the embodiment of my invention depicted in FIGS. 1 and 2, an instruction word appearing in order word register 10 is decoded in decoder-distributor 12. The system includes five single order cables, RD, WRT, RTR, SFT and XFR, and three combined order cables, SFT–RD, SFT–WRT and SFT–XFR, the eight order cables being shown by dotted lines. Decorder-distributor 12 applies various bits to one of these order cables in accordance with the order coding shown in FIG. 3. The eight upper rows of FIG. 3 represent the normal single and combined orders which may be included in the system of FIGS. 1 and 2. Only one of the eight order cables is energized at any one time, depending on the order to be executed.

The numbers in parentheses in FIGS. 1 and 2 represent the bits in the instruction word whose values are transmitted along the order cables. For example, when a shift order is executed, bits 22–14 of the instruction word contained in order word register 10 are transmitted along respective conductors in order cable SFT to shift control circuit 14 and shift register selector 16. Certain of the cables in FIGS. 1 and 2 which are not order cables also have numbers within parentheses associated with them. These numbers are followed by the word "bits," and indicate the number of bits transmitted from one unit to another over the respective cable. These additional labels have been included only where they are required for the purpose of clarification.

Before the eight orders which may be executed are discussed, certain remarks might be made concerning the individual circuits in the system. In this specific embodiment of my invention, memory store 18 comprises $2^{23}$ locations. Each of the memory locations contains a 28-bit word, which may be either a data word or an instruction word. The memory may include input/output equipment of the type described in the copending application of W. Ulrich, Ser. No. 402,090 filed Oct. 7, 1964. Read circuit 20 transmits a 23-bit address to memory store 18 over cable 22. The read circuit also notifies word director 24 over cable 26 of the nature of the word to be read from the memory store. A 28-bit word is read from memory store 18 and transmitted via cable 28 to word director 24. If the word read is an instruction word to be sent to order word register 10, the full 28-bit word is transmitted via cable 30 to order word register 10. The particular instruction word which is placed in order word register 10 is controlled by program address register 32. The program address register successively applies 23-bit addresses to cable 34. Each address represents the location of an instruction word in memory store 18. Increment circuit 35 increments the number contained in program address register 32, and consequently successive addresses are normally transmitted to memory store 18, and successively stored instructions are transmitted by word director 24 to order word register 10.

If instead of the address originating in program address register 32, a 23-bit address appears on order cable RD, read circuit 20 is notified that the word to be read is data and is to be directed to the masking circuit 38 rather than the order word register. While a full 28-bit word is again read from the specified memory store location, only the 21 least significant bits, the data word, are transmitted to masking circuit 38.

It is also possible to write a word into the memory store when a write order is executed. Twenty-one bits are transmitted along cable 44 to write circuit 46. At the same time a 23-bit address is transmitted from the write (WRT) order cable to the write circuit. The 21-bit data word is written into the first 21 positions of the memory location specified by the address transmitted on the write order cable.

In many data processing machines, a mask option is available on various types of orders. A mask blocks the transmission of selected bits in a word being transferred from one part of the machine to another. For example, in a six-bit machine the word 101011 might be transferred from a memory store to a register. In the course of the transfer, the word passes through a masking circuit. Suppose the mask in the masking circuit is the word 011110. Each bit in the mask is associated with a respective digit in the word. If the mask bit is a 1 the respective digit of the word is allowed to pass through the masking circuit to be written into the register. If the mask bit is a 0 the respective digit in the word is blocked from passing through the masking circuit to the register. Thus, in the example selected, the only digits in the word which are passed through the masking circuit to the register are the four center digits 0101. The two outer digits in the word are blocked. Suppose the register originally contained the word 111000. The four digits coming through the masking circuit are written into the four center stages of the register. The two outer stages of the register are unaffected because no digits are passed through the masking circuit to be written into these stages. Thus, the final word appearing in the register after the masking operation is 101010. A mask option is often highly advantageous because it allows the writing of bits into only a portion of a register or a memory location. (In other machines "product" masking is available as well as the "insertion" masking just described. "Product" masking is described in the above-identified Doblmaier et al. application. My invention is equally applicable to such machines, and even to machines providing no mask option.)

The mask option may be provided in a particular machine for a variety of orders. In the system shown the mask option is provided on read and register-to-register orders. A 21-bit mask appears in mask register 48. A 21-bit word appears at the input of masking circuit 38 on either cable 36 or cable 50. If bit 25 in either order cable RD or order cable RTR is a 1, mask register 48 controls the masking of the word transmitted through the masking circuit by the mask in the mask register. If bit 25 is a 0, the input word to the masking circuit passes through it to cable 42 unaffected. If the mask option is not ordered, the 21-bit word on either cable 36 or 50 appears on the cable 42. If the mask option is ordered, fewer than 21 bits will appear on cable 42 depending on the mask word stored in mask register 48.

When either the read or the register-to-register order is executed, bits 24 and 23 of the instruction word are transmitted to register selector 52. These bits specify one of the A, B, C and D registers. The 21-bit word on cable 42 is directed along one of the four output cables of the register selector to be written into a respective one of the four shift registers. If the C register, the addend shift register, is specified the masked word is written into this register and applied to one of the inputs of adder 54. The word in the D register is applied to the other input of the adder. The adder derives the sum word and writes it in the D register. The original masked word remains in the C register, and the contents of the D register are the sum of the word now in the C register and the previous contents of the D register. A word written directly into the D register by the register selector has no effect on the C register. Adder 54 is provided for controlling all addition operations. Two words may be added together by placing a first word in the D register and by writing the second word into the C register. The second word remains in the C register and the sum appears in the D register.

When either write or register-to-register orders are executed, register reader 56 operates. On a write order, order cable WRT is energized and bits 24 and 23 of the instruction word are transmitted to register reader 56. These bits specify one of the A, B, C and D registers. The register reader reads out the word from the register specified and applies it to cable 44. It is this 21-bit word which is written into the memory store. If, on the other hand, a register-to-register order is being executed and order cable RTR is energized, bits 22 and 21 of the instruction word are transmitted to register reader 56. The register reader operates in a similar manner but applies the 21-bit word read out of one of the registers to cable 50 rather than cable 44.

Shift control circuit 14 and shift register selector 16 control the shifting and rotating of the bits in one of registers A–D. When a shift order is executed, bits 20–14 are transmitted to shift control circuit 14 along order cable SFT. Bit 20 determines whether a shifting or rotating operation is to take place. Bit 19 specifies the direction, either left or right. The five bits 18–14 specify the magnitude of the shift. Shift control circuit 14 interprets the information represented by bits 20–14 and notifies shift register selector 16 over cable 58 of the nature, direction and magnitude of the shift operation to be performed. Bits 22 and 21 are transmitted directly along order cable SFT to shift register selector 16, and specify one of registers A–D. Shift register selector 16 then controls the shifting of the bits in one of the four shift registers over a respective cable in accordance with the information contained in bits 22–14. If the C register is specified, its contents are shifted in the normal manner. Adder 54 does not operate when the word in the C register is shifted or rotated. Adder 54 operates only when a new word is written into the C shift register by register selector 52.

The operation of the system of FIGS. 1 and 2 may be best understood by considering the manner in which each of the eight types of orders is executed. Program address register 32 transmits 23-bit successively numbered addresses over cable 34 to read circuit 20. The read circuit controls the reading of the specified 28-bit instruction word from memory store 18, and controls word director 24 to transmit the full 28-bit word over cable 30 to order word register 10. The addresses in program address register 32 are incremented by increment circuit 35. When it is necessary to transfer to an instruction out of sequence order cable XFR is energized. As seen in FIG. 3 a transfer order is represented by the code 01110 in bits 27–23 of an instruction word. When this code appears in these bits of the order word register, bits 22–0 in the instruction word in the register are transmitted along order cable XFR to the program address register. These 23 bits are substituted in register 32 for the address originally contained therein, this original address having controlled the transmission to the order word register of the instruction which controls the transfer operation itself. Twenty-three bits are transmitted to the program address register to identify the location of the next instruction. It is this new address in the program address register which is thereafter incremented to control the transmission to the order word register of successively addressed instructions. In FIG. 3 the "order" column of the table indicates the order, the order cable energized, and the bits transmitted along this order cable for each of the instruction word codes. When a transfer order is executed order cable XFR is energized, and bits 22–0 in the instruction word appear on the cable.

A shift order is represented by the code 01100 in bits 27–23 of an instruciton word. Order cable SFT is energized, and bits 22–14 are transmitted along the order cable to shift control circuit 14 and shift register selector 16. Bits 20 notifies the shift control circuit of the type of shift operation to take place. If bit 20 is a 1 the bits in the register specified are shifted rather than rotated, and if bit 20 is a 0 the bits in the register are rotated rather than shifted. In a shift operation the bits at one end of the register are shifted out of the register, and 0's are written into the stages at the other end of the register. When the bits are rotated the bits shifted out of one end of the register are reinserted at the other end. Bit 19 controls the direction of the shift. If bit 19 is a 1 the bits in the specified register are rotated or shifted to the right, and if bit 19 is a 0 the bits are rotated or shifted to the left. Bits 18–14 control the magnitude of the shift. These five bits represent one of the numbers 1–22, and enable the shift control circuit to determine how many positions the bits in the specified register are to be shifted or rotated. The shift command signals appear on cable 58. Bits 22 and 21 are transmitted to shift register selector 16. These bits identify one of shift registers A–D. Shift register selector 16 directs the shift command signals on cable 58 to the specified register. Only bits 27–14 are required to represent a shift order, bits 27–23 representing the shift order code, and bits 22–14 representing the shift information required. Bits 13–0 in the instruction word are not used when a shift order is executed. Bits may appear in stages 13–0 of order word register 10, but decoder-distributor 12 is not controlled by these bits, nor does it transmit these bits to any of the system units.

A read order is represented by the code 10 in bits 27 and 26 of an instruction word. Order cable RD is energized and bits 25–0 are transmitted along respective conductors in this cable to various units in the system. Bits 22–0 are directed to read circuit 20. Bit 25 is transmitted to mask register 48. If bit 25 is a 1 the 21-bit mask in register 48 controls the masking of the 21-bit word transmitted to the masking circuit. Bits 24 and 23 in the read order cable notify register selector 52 of the identity of one of registers A–D, the masked word on cable 42 being transmitted by the register selector to the specified register. The masked word is stored in the register, and if it is stored in the C register the sum of the masked word and the previous contents of the D register are stored in the D register.

When the code 010 appears in bits 27–25 of the instruction word, order cable WRT is energized and a write order is executed. Bits 24 and 23 are transmitted to register reader 56 which reads the word from the register specified by these bits and applies the 21-bit word read to cable 44. At the same time bits 22–0 in the instruction word are transmitted to write circuit 46. Bits 22–0 identify a particular one of the $2^{23}$ locations in the memory store. The bits to be written as well as the addressing information are transmitted from write circuit 46 to memory store 18 over cable 57.

When the code 00 is contained in bits 27 and 26 of an instruction word a register-to-register order is executed. Order cable RTR is energized, and bits 22 and 21 notify register reader 56 of the identity of the register whose contents are to be read and directed along cable 50 to masking circuit 38. Bits 20–0 represent a 21-bit mask and are written directly into mask register 48. Bit 25 is a 1 if masking is to occur, and the mask written into the mask register controls the masking of the 21-bit word on cable 50 as it passes through the masking circuit to cable 42. Bits 24 and 23 are transmitted to register selector 52 and control the writing of the masked word into one of registers A–D.

It should be noted that when a read order is executed the mask must already appear in register 48 if the mask option is called for. A mask may be written into register 48 to be used on a read order as follows. A register-to-register order may be executed for which bit 25 in the instruction word is a 0. The mask in bits 20–0 will be stored in the mask register, to be used in the execution of a subsequent read order, but masking will not take place in the execution of the register-to-register order during which the mask is stored in register 48. When this register-to-register order is executed bits 24 and 23 may be the same as bits 22 and 21, in which case the word read from one of the shift registers is merely written into it again unchanged. In this manner a mask may be stored in the mask register to be subsequently used on a read order. It is also possible to transfer the word from one of the registers to another while the mask is being stored in register 48 for subsequent use in a read order. Bits 24 and 23 would in this case be different from bits 22 and 21.

The system of FIGS. 1 and 2 is also capable of executing combined orders, a pair of orders being represented by a single instruction word, as set forth in the prior mentioned Ulrich application. Order cable SFT–RD controls the simultaneous execution of shift and read orders. Order cable SFT–WRT controls the simultaneous execution of shift and write orders. Order cable SFT–XFR controls the simultaneous execution of shift and transfer orders.

Consider first the shift-transfer order. The combined order is represented by the code 01101 in bits 27–23 of the instruction word, as shown in FIG. 3. Order cable SFT–XFR is extended to shift control circuit 14, shift register selector 16 and program address register 32, and the remaining bits in the instruction word, 22–0, are transmitted on the order cable to these units. Bits 22–14 are transmitted to shift control circuit 14 and shift register selector 16 to control the shift operation. These units operate in response to the bits transmitted to them just as they do when the normal shift order is executed. Bits 13–0 in the instruction word controlling the normal shift order are not used. However, when the combined order is executed these bits are transmitted to program address register 32. These bits identify the address of the instruction to which the transfer is required. Ordinarily, 23 bits are required to transfer to a new instruction. Only 14 bits are available for this purpose in the shift-transfer order. These 14 bits are written into the 14 least significant stages in program address register 32. Zeros are automatically written into the eight most significant positions. (Any of many well-known circuits may be utilized for this purpose.) Thus when the combined order is executed the transfer may be to only one of $2^{14}$ addresses rather than to one of $2^{23}$ addresses. The range of transfer is thus restricted. However, whenever the instruction to which the transfer is required is contained within the restricted range, the combined order may be executed rather than the normal or individual order. If the combined order is used a shift operation may occur at the same time that a transfer is taking place.

The code 11 in bits 27 and 26 of the instruction word controls the energization of the shift-read order cable. This order cable is extended to all of the units to which the individual shift and read order cables are connected. Bits 22–14 once again control the shift operation in the ordinary manner. Bit 25 controls the operation of mask register 48, and bits 24 and 23 control the operation of register selector 52. Shift control circuit 14, shift register selector 16, register selector 52 and mask register 48 operate precisely as they do when the respective individual shift and read orders are executed. The only difference in the operation of the system when the combined order is executed is that only bits 13–0 in the instruction word, the only bits remaining, are transmitted to read circuit 20, rather than bits 22–0 which are transmitted to the read circuit when the normal read order is executed. The read circuit again transmits a 23-bit address over cable 22 to the memory store, the read circuit automatically writing 0's into the nine most significant bits in the address transmitted to the memory store. Thus when the combined shift-read order is executed the word which may be read from the memory store is only one of $2^{14}$, rather than one of $2^{23}$. A 28-bit word is delivered on cable 28 to word director 24, the first 21 bits of which, the data word, are then directed over cable 36 to masking circuit 38.

The third combined order, shift-write, is represented by the code 01111 in bits 27–23 of the instruction word. The remaining bits 22–0 are transmitted along order cable SFT–WRT to all of the units which operate when the individual shift and write orders are executed. Again, bits 22–14 are transmitted to shift control circuit 14 and shift register selector 16 to control the shift operation. Bits 13 and 12 are transmitted to register reader 56. When the normal write order is executed bits 24 and 23 control the operation of register reader 56. (When the normal register-to-register order is executed bits 22 and 21 control the operation of the register reader.) When the combined order is executed bits 13 and 12 identify that one of registers A–D whose contents are to be written into the memory store. Only bits 11–0 remain in the instruction word to specify the address in the memory store into which the word read is to be written. In the illustrative embodiment of the invention these bits represent any one of $2^{12}$ locations, into the first 21 bits of which is to be written the 21-bit word on cable 44.

Thus far the operation of the system just described is the same as that in the above-identified W. Ulrich application Ser. No. 402,090, in which there is ordinarily no reason to specify a shift-read order with a shitt magnitude greater than 21. The maximum shift required for a 21-bit word is 21 positions. Thus a shift magnitude of 22 positions in a shift-read order would ordinarily not be given; since it is not plausible to specify a shift greater than the number of positions in a register, such a shift magnitude will be referred to herein as an implausible amount. In my invention however when a shift-read order is specified with bits 18–14 representing an implausible amount, such as the magnitude 22, the read order is executed in the normal manner but the shift operation is inhibited. Instead, the word read from memory, after masking, is automatically stored in register D in addition to being stored in whatever register is represented by bits 22 and 21 in the instruction word. The only circuits which are required to effect this operation are detector 71 (connected to order cable SFT–RD), conductors 76 and 74, normally enabled gate 77, normally inhibited gate 72, and cables 73 and 75.

As shown in the last row of FIG. 3 the coding for the special instruction of the invention is the same as that for the ordinary shift-read order. The only condition which must be satisfied in order for the special order to be executed is for the shift magnitude in the instruction word to be 22, i.e., bits 18–14 represent the binary number 10110. Bits 18–14 on order cable SFT–RD are extended to detector 71. Detector 71 operates only when the shift magnitude 22 is represented in bits 18–14. At this time control signals are applied by the detector to conductors 76 and 74. Gate 77 is normally enabled and allows the command signals from shift control circuit 14 to be transmitted over cable 58 to shift register selector 16. However, when detector 71 operates gate 77 is inhibited from operating. Consequently, the shift command signals are not transmitted to shift register selector 16 and a shift operation which would otherwise occur is prevented.

At the same time, the masked data word from the memory store is directly stored in the D register. Under control of the read part of the combined order, the word read into register selector 52 is directed to one of the shift registers, depending upon the coding of bits 24 and 23 in the instruction word. In the event one of the A, B and C registers is specified, and it is also desired to store the word in register D, the combined read-shift order is executed with a shift magnitude of 22. At the same time that register selector 52 directs the word to one of the A, B and C registers gate 72 is enabled by detector 71. The 21-bit word at the output of the masking circuit on cable 73 passes through the gate to cable 75. This cable is directly connected to that output of the register selector which is connected to the input of the D register. Consequently, while the register selector applies the 21-bit word to one of its three output cables connected to registers A, B and C, the word is also applied, via gate 72, to the register selector output cable connected to the D register. The masked data word is thus read into the D register as well as one of registers A, B and C. (If the masked word is to be read into only the D register the ordinary read order should be used with bits 24 and 23 specifying this register.)

A primary advantage of the present invention is that very little additional circuitry is required to control the reading of a memory word into a second register as well as a first. The ordinary read order contains an insufficient number of bits to control the reading of the word into the second register as well as the first. However a double-read order may be effected by using the shift-read order in the manner described. The shift part of the order is not executed; instead, the additional register storage takes place.

In the illustrative embodiment of the invention detector 71 opeates only responsive to the shift magnitude 22 appearing in the shift-read instruction word. When the detector operates the word read is automatically gated to the D register as well as to one of registers A, B and C. It is often necessary to store a word in the D register as well as one of registers A, B and C. This may be understood by considering a particular example. Suppose it is necessary in some sequence of operations to take two words from the memory store, represent each of them in a different one of the system registers, and represent the sum of the two words in a third of the system registers. This may be acomplished in only two steps by utilizing the special instruction of the invention. A first shift-read instruction is executed in which the first word read from the memory is directed to register A and the same word is directed to register D by making the shift magnitude equal to 22. An ordinary read order is then executed with the second word being directed to register C. When the word is written into register C adder 54 operates and the sum of this word and the word previously in register D is stored in register D. Thus after the two orders are executed the first word is stored in register A, the second is stored in register C, and the sum is stored in register D. Were it not possible to store the first word in the D register as well as the A register when the first order is executed it would be necessary to provide three instructions to carry out the desired sequence.

It is apparent that the principles of the invention may be applied to effect other desired operations. For example, another detector might be provided to detect a shift magnitude of 23. Additional circuitry, controlled by this detector, might be provided to direct the word read into the C register as well as into the register specified in the read-shift order. Other detectors might be provided to control other operations which are not even connected with the execution of the read order. For example, a detector might be provided to detect the shift magnitude 24 for operating circuitry which might inhibit the operation of adder 54 even if the word read from the memory is written into the C shift register. Numerous other possibilities exist. The five bits 18–14 in the shift-read instruction word may represent shift magnitudes up to the number 31. The maximum magnitude required for the execution of a shift order is 21. Thus 10 codes, representing implausible shift amounts, are available for controlling ten additional operations in the machine, only one possibility of which has been described in detail.

Similarly, special detecting circuits may be connected to the SFT–XFR and SFT–WRT order cables for operating in a similar manner, i.e., to inhibit the shift operation and to control additional operations whenever a shift magnitude greater than 21 is specified in the instruction word. The principles of the invention are applicable wherever a system is provided with combined-order instructions, one order of which is a shift (or rotate). Furthermore, in systems in which one of the combined orders is a logical operation other than shift the principles of the invention may also have application. Wherever some otherwise unnecessary or redundant code is given, a special detecting circuit may inhibit the normal operation and instead control a different sequence of data manipulation.

Although the invention has been described with a certain degree of particularity it is to be understood that the above-described arrangement is merely illustrative of the principles of the invention. Numerous modifications may be made therein and other arrangements may be devised without departing from the spirit and scope of the invention.

What is claimed is:

1. A data processor comprising
a memory store,
a plurality of registers,
an order distributor, said order distributor containing an instruction word including an order part and a constant part,
means responsive to a first type of order part being contained in said order distributor for reading into one of said registers the data stored in the memory location represented by the constant part contained in said order distributor,
shifting means responsive to a second type of order part being contained in said order distributor for controlling the shifting of the data in one of said registers in the manner and by the magnitude represented by the constant part contained in said order distributor,
means responsive to a third type of order part being contained in said order distributor for controlling said reading means to read into one of said registers the data stored in the memory location represented by a portion of the constant part contained in said order distributor and for controlling said shifting means to shift the data in one of said registers in the manner and by the magnitude represented by the remaining portion of said constant part,
and means responsive to said third type of order part being contained in said order distributor and to a predetermined magnitude being represented in said remaining portion of said constant part for inhibiting the operation of said shifting means and for controlling said reading means to read the data read into said one of said registers into another additional predetermined one of said registers.

2. In a data processor the combination comprising
a plurality of registers,
an order distributor, said order distributor containing an instruction word including an order part and a constant part, means responsive to a first type of order part being contained in said order distributor for writing data into one of said registers in accordance with the constant part contained in said order distributor,
shifting means responsive to a second type of order part being contained in said order distributor for controlling the shifting of the data in one of said registers in the manner and by the magnitude represented by the constant part contained in said order distributor,
means responsive to a third type of order part being contained in said order distributor for controlling said writing means to write data into one of said registers in accordance with a portion of the instruction word contained in said order distributor and for controlling said shifting means to shift the data in one of said registers in the manner and by the magnitude represented by the remaining portion of said instruction word,
and means responsive to said third type of order part being contained in said order distributor and to a predetermined magnitude being represented in the remaining portion of said instruction word for inhibiting the operation of said shifting means and for controlling said writing means to write the data written into said one of said registers into another additional predetermined one of said registers.

3. A data processor comprising
means defining a plurality of memory locations,
an order distributor, said order distributor containing an instruction word including an order part and a constant part,
means responsive to a first type of order part being contained in said order distributor for transferring data to one of said memory locations in accordance with the constant part contained in said order distributor,
shifting means responsive to a second type of order part being contained in said order distributor for controlling the shifting of the data in one of said memory locations in the manner and by the magnitude represented by the constant part contained in said order distributor,
means responsive to a third type of order part being contained in said order distributor for controlling said transferring means to transfer data to one of said memory locations in accordance with a portion of the instruction word contained in said order distributor and for controlling said shifting means to shift the data in one of said memory locations in the manner and by the magnitude represented by the remaining portion of said instruction word,
and means responsive to said third type of order part being contained in said order distributor and to a predetermined magnitude being represented in said remaining portion of said instruction word for inhibiting the operation of said shifting means and for controlling said transferring means to transfer the data transferred to said one memory location to another additional predetermined one of said memory locations.

4. A data processor comprising
means defining a plurality of memory locations,
an order distributor, said order distributor containing an instruction word including an order part and a constant part,
means responsive to a first type of order part being contained in said order distributor for transferring data to one of said memory locations in accordance with the constant part contained in said order distributor,
logical operation performing means responsive to a second type of order part being contained in said order distributor for performing a logical operation on the data in one of said memory locations in accordance with logical control information represented by the constant part contained in said order distributor, means responsive to a third type of order part being contained in said order distributor for controlling said transferring means to transfer data to one of said memory locations in accordance with a portion of the instruction word contained in said order distributor and for controlling said logical operation performing means to operate on the data in one of said memory locations in accordance with the logical control information represented by the remaining portion of said instruction word, and means responsive to said third type of order part being contained in said order distributor and to a predetermined value of said logical control information being represented in said remaining portion of said instruction word for inhibiting the operation of said logical operation performing means and for controlling said transferring means to transfer the data transferred to said one memory location to another additional predetermined one of said memory locations.

5. A data processor comprising means defining a plurality of memory locations, an order distributor, said order distributor containing an instruction word, means responsive to a first type of instruction word being contained in said order distributor for transferring data to one of said memory locations in accordance with said first type of instruction word, means responsive to a second type of instruction word being contained in said order distributor for performing a logical operation on the data in one of said memory locations in accordance with said second type of instruction word, means responsive to a third type of instruction word being contained in said order distributor for controlling said transferring means to transfer data to one of said memory locations in accordance with a portion of the instruction word contained in said order distributor and for controlling said logical operation performing means to operate on the data in one of said memory locations in accordance with logical control information represented by the remaining portion of said instruction word, and means responsive to said third type of instruction word being contained in said order distributor and to a predetermined value of said logical control information being represented in said remaining portion of said instruction word for inhibiting the operation of said logical operation performing means and for controlling said transferring means to transfer the data transferred to said one memory location to another additional predetermined one of said memory locations.

6. A data processor comprising means defining a plurality of memory locations, an order distributor, said order distributor containing an instruction word, means responsive to a first type of instruction word being contained in said order distributor for performing a first type of data processing operation at one of said memory locations in accordance with said first type of instruction word, means responsive to a second type of instruction word being contained in said order distributor for performing a second type of data processing operation at one of said memory locations in accordance with said second type of instruction word, means responsive to a third type of instruction word being contained in said order distributor for controlling said first data processing performing means to operate in accordance with a portion of the instruction word contained in said order distributor and for controlling said second data processing performing means to operate in accordance with information represented by the remaining portion of said instruction word, and means responsive to said third type of instruction word being contained in said order distributor and to a predetermined value of said information being represented by said remaining portion of said instruction word for inhibiting the operation of said second data processing performing means and for controlling said first data processing performing means to operate at another additional predetermined one of said memory locations.

7. A data processor comprising means defining a plurality of memory locations, an order distributor, said order distributor containing an instruction word, means responsive to a predetermined type of instruction word being contained in said order distributor for performing a first type of data processing operation at one of said memory locations in accordance with a portion of said predetermined type of instruction word and for performing a second type of data processing operation at a second one of said memory locations in accordance with information represented by the remaining portion of said instruction word, and means responsive to said predetermined type of instruction word being contained in said order distributor and to a predetermined value of said information being represented by said remaining portion for preventing the performance of said second type of data processing operation at said second memory location and for controlling the performance of said first type of data processing operation at an additional predetermined one of said memory locations.

8. A data processor comprising means defining a plurality of memory locations, an order distributor, said order distributor containing an instruction word, means responsive to a first type of instruction word being contained in said order distributor for performing a first type of data processing operation at one of said memory locations in accordance with said first type of instruction word, means responsive to a second type of instruction word being contained in said order distributor for performing a second type of data processing operation at one of said memory locations in accordance with said second type of instruction word, means responsive to a third type of instruction word being contained in said order distributor for controlling said first data processing performing means to operate in accordance with a portion of the instruction word contained in said order distributor and for controlling said second data processing performing means to operate in accordance with information represented by the remaining portion of said instruction word, and means responsive to said third type of instruction word being contained in said order distributor and to a predetermined value of said information being represented by said remaining portion of said instruction word for inhibiting the operation of said second data processing performing means and for controlling said first data processing performing means to perform said first data processing operation at two of said memory locations.

9. A data processor comprising means defining a plurality of memory locations, an order distributor, said order distributor containing an instruction word, means responsive to a predetermined type of instruction word being contained in said order distributor for performing a first type of data processing operation at one of said memory locations in accordance with a portion of said predetermined type of instruction word and for performing a second type of data processing operation at a second one of said memory locations in accordance with information represented by the remaining portion of said instruction word, and means responsive to said predetermined type of instruction word being contained in said order distributor and to a predetermined value of said information being represented by said remaining portion for preventing the performance of said second type of data processing operation at said second memory location and for controlling the performance of said first type of data processing operation at two of said memory locations.

10. A data processor comprising means defining a plurality of memory locations, an order distributor, said order distributor containing an instruction word, means responsive to a first type of instruction word being contained in said order distributor for performing a first type of data processing operation at one of said memory locations in accordance with said first type of instruction word, means responsive to a second type of instruction word being contained in said order distributor for performing a second type of data processing operation at one of said memory locations in accordance with said second type of instruction word, means responsive to a third type of instruction word being contained in said order distributor and to information represented by a predetermined portion of said third type of instruction word for controlling the operations of both said first and second data processing performing means, and means responsive to said third type of instruction word being contained in said order distributor and to a predetermined value of said information for inhibiting the operation of said second data processing performing means and for controlling said first data processing performing means to perform said first data processing operation at two of said memory locations.

11. A data processor comprising means defining a plurality of memory locations, an order distributor, said order distributor containing an instruction word, means responsive to a predetermined type of instruction word being contained in said order distributor for performing a first type of data processing operation at one of said memory locations and for performing a second type of data processing operation in accordance with a predetermined type of instruction word at a second one of said memory locations, and means responsive to said predetermined type of instruction word being contained in said order distributor and to predetermined information being contained in said portion of said predetermined type of instruction word for preventing the performance of said second type of data processing operation at said second memory location and for controlling the performance of said first type of data processing operation at two of said memory locations.

12. A data processor comprising a data word memory store, a plurality of registers, an instruction word register containing an instruction word, means responsive to a predetermined type of instruction word being contained in said instruction word register for reading a data word from said memory store into one of said registers and for shifting a data word in any of said registers a number of positions in accordance with a shift magnitude represented in said predetermined type of instruction word, and means responsive to a predetermined shift magnitude being represented in said predetermined type of instruction word in said instruction word register for preventing said shifting of a data word and for controlling instead the reading of said data word from said memory store into a second one of said registers.

13. A data processor comprising means defining a plurality of memory locations, an instruction word register, means responsive to a first type of instruction word being contained in said instruction word register for transferring a data word from one of said memory locations to a second of said memory locations, means responsive to a second type of instruction word being contained in said instruction word register for shifting a data word in one of said memory locations in accordance with said second type of instruction word, means responsive to a third type of instruction word being contained in said instruction word register for controlling said transferring means to transfer a data word from one of said memory locations to a second of said memory locations and for controlling said shifting means to shift the data word in one of said memory locations in accordance with shift information represented by a predetermined portion of said third type of instruction word, and means responsive to said third type of instruction word representing a predetermined value of said shift information for inhibiting the operation of said shifting means and for controlling said transferring means to transfer the data word in said one memory location to two others of said memory locations.

14. A data processor comprising a memory store, a plurality of registers, an instruction word register for representing an instruction word including shift magnitude information, means responsive to said instruction word for reading a data word from said memory store into one of said registers and for shifting the data word in any of said registers a number of positions dependent upon said shift magnitude, means for detecting a predetermined shift magnitude included in said instruction word, means responsive to said detecting means for inhibiting said shifting of a data word, and gating means responsive to said detecting means for reading the data word read from said memory store into said one of said registers into an additional one of said registers.

15. A data processor comprising a memory store, a plurality of registers, means containing an instruction word, a part of said instruction word representing a shift magnitude, means normally responsive to said instruction word for reading a data word from said memory store into one of said registers in accordance with said instruction word, means normally responsive to said instruction word for shifting a data word in any of said registers a number of positions dependent upon said shift magnitude represented in said instruction word, and means responsive to a predetermined shift magnitude being represented in said instruction word for inhibiting the operation of said shifting means and for controlling said reading means to read a data word from said memory store into two of said registers.

16. A data processor comprising a memory store, a plurality of registers, an instruction word register containing an instruction word, said instruction word including bits for representing a first one of said registers, a second one of said registers, and a shift magnitude, means responsive to said instruction word for reading a data word from said memory store into said first register, means responsive to said instruction word for shifting the data word in said second register in accordance with said shift magnitude represented in said instruction word, means for detecting a predetermined shift magnitude represented in said instruction word, and means responsive to said detecting means for inhibiting the operation of said shifting means and for controlling said reading means to read the data word read from said memory store into an additional predetermined one of said registers as well as said first register.

17. In a data processor the combination comprising a plurality of registers, an order distributor containing an instruction word, means responsive to a first instruction word in said order distributor for performing a first operation, means responsive to a second instruction word in said order distributor for controlling the shifting of a data word in one of said registers by an amount specified by said second instruction word, means responsive to a third instruction word in said order distributor for causing both the performing of said first operation and the shifting of a data word in said one register by an amount specified by said third instruction word, and means responsive to said third instruction word specifying the shifting of said data word by an implausible amount for inhibiting the shifting of said data word in said one register and for performing instead a second operation.

18. In a data processor the combination comprising a plurality of registers, an order distributor containing an instruction word, means responsive to a specified instruction word for both performing a first operation and for controlling the shifting of data in one of said registers by an amount specified by said instruction word, and means responsive to said instruction word specifying the shifting of said data by an implausible amount for inhibiting said shifting and for performing instead a second operation.

19. In a data processor the combination in accordance with claim 18 wherein said means for performing a first operation includes means for reading a data word into a second of said registers and said means for performing said second operation includes means for reading said data word into a third of said registers.

References Cited

UNITED STATES PATENTS

| | | | |
|---|---|---|---|
| 3,008,127 | 11/1961 | Bloch et al. | 340—172.5 |
| 3,061,192 | 10/1962 | Terzian | 340—172.5 |
| 3,193,666 | 7/1965 | Keir | 340—172.5 |
| 3,229,260 | 1/1966 | Falkoff | 340—172.5 |
| 3,230,513 | 1/1966 | Lewis | 340—172.5 |
| 3,234,523 | 2/1966 | Blixt et al. | 340—172.5 |
| 3,242,465 | 3/1966 | Gloates et al. | 340—172.5 |
| 3,275,989 | 9/1966 | Glaser et al. | 340—172.5 |

PAUL J. HENON, *Acting Primary Examiner.*

J. VANDENBURG, *Assistant Examiner.*